Oct. 21, 1924.

A. F. GREINER

SINGLE BUTTON SWITCH

Filed Dec. 29, 1922

1,512,169

ANTON F. GREINER INVENTOR.

BY Richey, Slough + Watts

HIS ATTORNEYS

Patented Oct. 21, 1924.

1,512,169

UNITED STATES PATENT OFFICE.

ANTON F. GREINER, OF DETROIT, MICHIGAN.

SINGLE-BUTTON SWITCH.

Application filed December 29, 1922. Serial No. 609,770.

*To all whom it may concern:*

Be it known that I, ANTON F. GREINER, a citizen of the Republic of Germany, and a resident of Detroit, county of Wayne, Michigan, have invented a certain new and useful Single-Button Switch; and I do hereby declare the following to be a full, clear, and exact description of the invention, such as will enable others skilled in the art to which it appertains to make and use the same.

This invention relates to electric switches, and more particularly to that type which is operated by pressure upon a single button.

The object of my invention is to provide a switch of simple construction, which can be readily operated, to place the switch either in or out of contact, by the inward pressure of a single button.

Another object of my invention resides in the provision of a movable mass, such as a ball, which is accelerated by the manual operation of the button to complete either the making or the breaking movement of the switch contact lever.

Another object of my invention resides in providing a reciprocable shaft which cooperates with a cam slot provided in mechanism connected to the switch contact lever, whereby an inward movement of the reciprocable shaft carrying a button, will move the switch lever from either side of the casing toward the top thereof, which movement accelerates a movable mass for continuing the movement of the switch lever, to form or break the contact.

These and other objects of my invention are shown in the drawings and will be pointed out in the following specification and claims:

Referring to the drawings.

Figure 1:
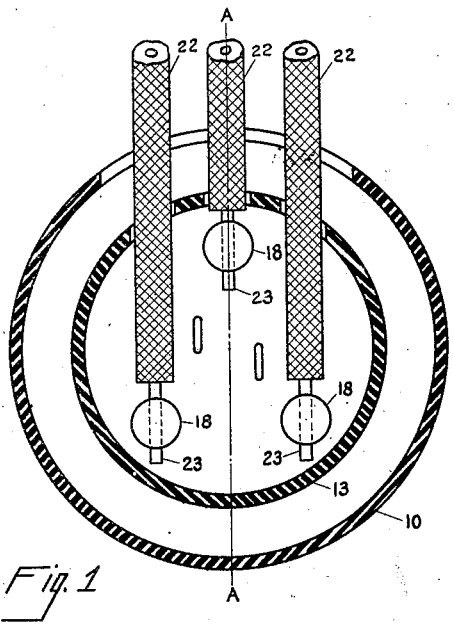
Fig. 1 is a sectional view of my invention with the end of the cover shell broken away.
Figure 2:
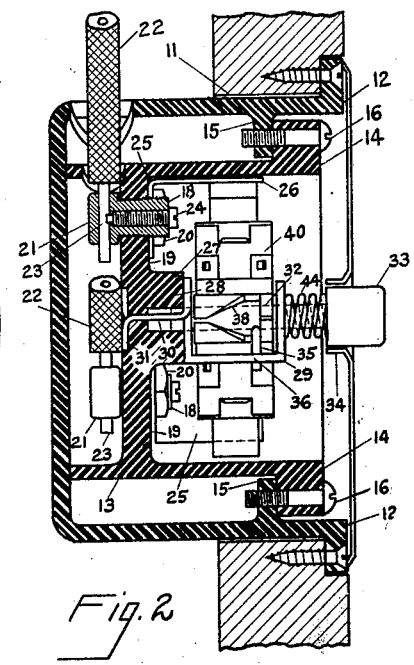
Fig. 2 is a sectional view of my improved switch and casing attached to a wall taken substantially on line A—A of Fig. 1.
Figure 3:
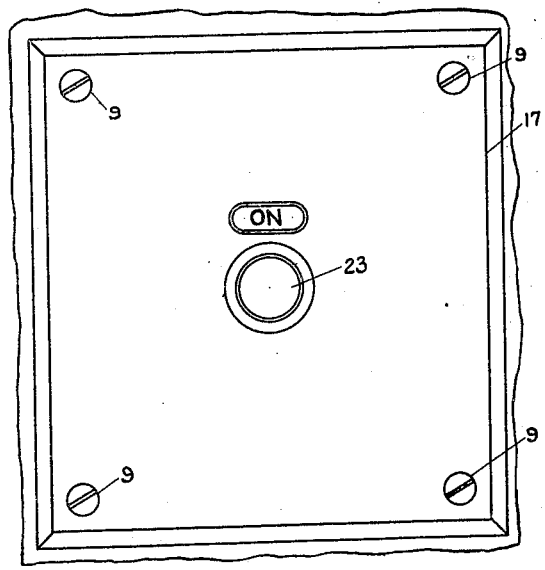
Fig. 3 is a front elevation of my switch with the cover plate attached.
Figure 4:
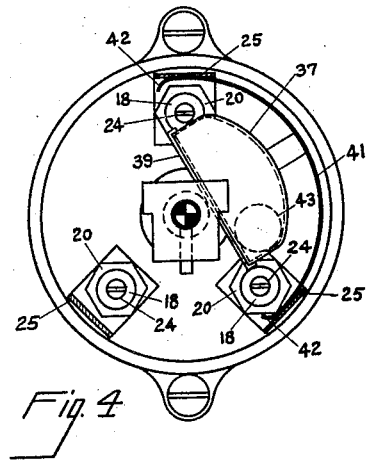
Fig. 4 is an end view of the inner casing and switch parts assembled therewith, removed from the outer cover shell.

An outer shell or casing 10 is formed of insulating material and has a closed end which extends through an opening 11 therefor in the wall. The opposite open end of the casing is provided with an outwardly extending flange 12 which lies within a circular recess in the wall and is secured therein by screws. A porcelain housing 13 lies within the casing and is provided with an outwardly projecting flange 14 which fits against a flange 15 extending inwardly from the casing and is secured thereagainst by the screw bolts 16. The outer shell serves only as a support and covering for the inner housing, and the inner housing carries the elements which make up the switch and the mechanism for operating the same. A cover plate 17 is secured over the open end of the casing 10 by screws 9, after the parts have been assembled.

The porcelain housing 13 is provided in this instance with three hollow terminal screw plugs 18, which extend through and are secured to the base wall 19 of the housing by nuts 20, which draw the apertured heads 21 of the bolts against the opposite side of the base wall. Insulated cables 22 extend through a slot in the casing and the terminals 23 thereof are inserted in the apertured heads 21 and are secured therein by set screws 24 which are screwed through the hollow terminal bolts.

Contact terminal plates 25 are secured to each terminal plug by the nuts 20 and the resilient ends 26 are bent up and extend inwardly adjacent the inside wall of the porcelain housing. These plates and plugs provide terminals which are in contact with the cables 22. I have shown three of these terminals, but for simple switches, two terminals are sufficient.

The inner base wall 19 of the porcelain housing is provided with an inwardly extending boss 27, and an aperture 28 extends therethrough and continues through the base wall in reduced diameter. A metal frame 29, having end walls and a connecting side wall, extends axially from the boss 27 and is provided with a leg 30 which extends through the aperture in the boss and the base wall and is secured thereto by having portions 31 thereof bent over at each end of the aperture. A reciprocable switch operating shaft 32 extends through openings in the end walls of the metal frame, into the aperture in the boss, and the outer end thereof has a button 33 secured thereto. This button extends through a central aperture in the cover plate and is guided by a circular, inwardly projecting flange 34 extending from the cover plate. A pin 35 is secured to and projects transversely from the shaft 32, and is positioned to lie within a slot 36 in the side wall of the frame 29. This slot receiving the pin 35 will position the operating shaft and prevent any rotation thereof and will also limit the inward and outward movement of the same to prevent displacement thereof when assembled.

A hollow member 37 having a V shaped cam slot 38 in the wall thereof is positioned to rotate upon the shaft 32, between the end walls of the frame 29. When the hollow member is assembled with the shaft upon which it rotates, it is positioned so that the pin 35 will lie within the cam slot 38. Secured integrally to the hollow member 37, but insulated therefrom by a fibre plate 39 is a hollow switch lever arm 40. The outer end of the lever arm carries a curved metal contact strip 41, the ends 42 of which are resilient. This strip is of sufficient length to extend between adjacent contact plates 25 of two terminals, transmitting electric current therebetween. The hollow member 37, retains a motion intensifying member 43 therein, such as a metal ball of high specific gravity. A coiled spring 44 extends between the end wall of the frame 29 and the inner end of the button, and is sufficient to return the button to normal extended position when pressure is released therefrom.

When the switch is assembled and it is desired to operate the same, the button 33 is pressed in, causing the shaft 32 and the pin 35 secured thereto to also move axially inwardly. As the pin 35 moves inwardly it engages one side of the V-shaped cam slot in the rotatable member 37, causing the member to rotate toward the top of the switch housing. The hollow switch lever arm 40 being secured to member 37 will also rotate upwardly to the top of the housing, which movement starts the ball 43 rolling toward the opposite end of the hollow lever arm, and as the movement is continued, the movement of the ball is accelerated, so that when the manually operated shaft has reached the limit of its inward movement, the ball will be accelerated sufficiently to pass over dead center and cause the hollow lever to continue rotating, until the contact strip 41 engages the terminal plate on the opposite side of the switch. Therefore in either final position the contact plate will connect the terminal at either side with the top terminal. The lever arm is operated in the same manner from either side. The button and its shaft are returned to outward position, after the hollow member reaches the top of the switch, when manual pressure is released therefrom. When a simple switch is desired one of the side terminals is detached, and the switch can be turned either on or off in the manner described above. The resiliency of the ends 42 of the contact plate and the resiliency of the contact plate ends 26 provide a tensioned contact which must be overcome by the manual movement of the operating shaft, the releasing action of which adds to the acceleration of the lever arm and the ball therein, which construction effects a tight contact when engaged, and provides an accelerated movement of the contact plate when released.

It will thus be seen that I provide a simple switch, wherein a slight pressure against a single button will develop power to automatically assist and complete the operation of the switch in either movement thereof.

Various changes can be made in the details of the described invention without departing from the spirit thereof and the scope of the appended claims.

Having thus described my invention, what I claim is:

1. A switch comprising a housing, terminals carried by said housing, a contact member adapted to extend between two adjacent terminals, an axially operated shaft for rotating said contact member in opposite directions, and means accelerated by the rotation of said contact member to further rotate said member to the opposite side of said housing.

2. A switch comprising a housing, terminals carried by said housing, a contact member adapted to extend between two adjacent terminals, an axially movable shaft adapted to be manually operated for rotating said contact member in opposite directions and means accelerated by the manual rotation of said contact member to further rotate said member to the opposite side of said housing.

3. A switch comprising a housing, terminals carried by said housing, a contact member adapted to extend between two adjacent terminals, an axially movable shaft adapted to be manually operated for rotating said contact member in opposite directions, a spring for normally extending said shaft when manual pressure is released, and means accelerated by the manual rotation of said contact member to further rotate said member to the opposite side of said housing.

4. A switch comprising a housing, terminals carried by said housing, a contact member adapted to extend between two adjacent terminals, a frame secured within said casing, an axially movable shaft mounted to slide through said frame and adapted to be manually operated to rotate said contact member in opposite directions, means accelerated by the manual rotation of said contact member to further rotate said member to a position on the opposite side of said housing and a spring for returning said shaft to extended position when pressure thereagainst is released.

5. A switch comprising a housing, terminals carried by said housing, a contact member adapted to extend between two adjacent terminals, a frame having end walls and a connecting side wall secured within said casing, said side wall having a slot therein, a manually operated shaft mounted to slide axially through the end walls of said frame, said shaft being adapted to rotate said contact member in opposite directions, a pin extending from said shaft into the slot of said frame, means accelerated by the manual rotation of said contact member to further rotate said member to a position on the opposite side of said housing, and a spring for returning said shaft to extended position when pressure thereagainst is released.

6. A switch comprising a housing, terminals carried by said housing, an axially manually movable shaft mounted in said housing, a contact member mounted to rotate about said shaft, and adapted to extend between two adjacent terminals, a hollow member extending around said shaft carrying said contact member, said hollow member having a cammed slot in the wall thereof, and means on said shaft cooperating with the cam slot in said hollow member to rotate said member and said contact member when said shaft is pressed inwardly, means accelerated by the manual rotation of said hollow member to further rotate said contact member to a position on the opposite side of said switch, and resilient means for returning said shaft to extended position when pressure thereagainst is released.

7. A switch comprising a housing, terminals carried by said housing, an axially manually movable shaft mounted in said housing, a contact member mounted to rotate about said shaft, and adapted to extend between two adjacent terminals, a hollow member extending around said shaft and carrying said contact member, said hollow member having a V-cam slot in the wall thereof, a pin on said shaft cooperating with the cammed slot in said hollow member to rotate said member and said contact member when said shaft is pressed inwardly, means accelerated by the manual rotation of said members to further rotate said contact member to a position on the opposite side of said switch, and resilient means for returning said shaft to extended position when pressure thereagainst is released.

8. A switch comprising a housing, terminals carried by said housing, a hollow lever arm having a contact strip secured thereto and adapted to extend between two adjacent terminals, an axially movable shaft adapted to be manually operated for rotating said lever arm, and a freely movable mass within said hollow lever arm adapted to be accelerated by the manual rotation thereof to further rotate said member to a position on the opposite side of said switch.

9. A switch comprising a housing, terminals carried by said housing, a hollow lever arm having a contact strip secured thereto and adapted to extend between two adjacent terminals, an axially movable shaft adapted to be manually operated for rotating said lever arm, and a freely movable ball within said hollow lever arm adapted to be accelerated by the manual rotation thereof to further rotate said member to a position on the opposite side of said switch.

10. A switch comprising a housing, terminals each having a resilient contact end extending adjacent the inner wall of said housing, an axially movable shaft mounted within said housing, a lever arm connected to and rotatable by manual axial pressure against said shaft, a contact strip secured to said lever arm, said strip having resilient ends adapted to form a tension contact with the resilient ends of the two adjacent terminals, means operated by the manual rotation of said lever arm to automatically accelerate the rotation of said arm to rotate the lever arm to a position on the opposite side of said switch.

11. A switch comprising a housing, terminals carried by said housing, a contact member adapted to extend between two adjacent terminals, a manually operated shaft for rotating said contact member in opposite directions, means accelerated by the manual rotation of said contact member to further rotate said member to a position on the opposite side of said housing, an outer insulated casing to which said housing is secured, and a button secured to the end of said shaft and extending through an aperture in said casing.

12. A switch comprising a housing, a plurality of spaced terminals carried by said housing, a contact member adapted to extend between and connect any two of said terminals, an axially operated shaft for rotating said contact member in opposite directions, and means accelerated by the rotation of said contact member to further rotate said member into contacting position with another pair of terminals.

13. A switch comprising a housing, three terminals carried by said housing, said terminals being arranged one at each side and at the top of said housing, a contact member adapted to extend between two of said terminals, an axially operated shaft for rotating said contact member in opposite directions, and means accelerated by the rotation of said contact member to complete the rotation of said member by gravity and position it in contact between the central terminal and the terminal at the opposite side of the housing with which it was in contact with previous to rotation of said shaft.

In witness whereof I have hereunto subscribed my name this 19 day of September, 1923.

ANTON F. GREINER.